United States Patent [19]

Audren

[11] Patent Number: 4,608,874
[45] Date of Patent: Sep. 2, 1986

[54] GYROSCOPE APPARATUS ROTATING CASING FOR A ROTOR

[75] Inventor: Jean-Thierry Audren, Les Ulis, France

[73] Assignee: Societe de Fabrication d'Instruments de Mesure (S.F.I.M.), Massy, France

[21] Appl. No.: 606,034

[22] Filed: May 1, 1984

[30] Foreign Application Priority Data

May 6, 1983 [FR] France ................... 83 07597

[51] Int. Cl.⁴ ............... G01C 19/28; G01C 19/30
[52] U.S. Cl. .................... 74/5.41; 74/5 R; 74/5.6 D
[58] Field of Search ............... 74/5.6 D, 5.41, 5.46, 74/5 R, 5 F

[56] References Cited

U.S. PATENT DOCUMENTS

| | | | |
|---|---|---|---|
| 3,463,016 | 8/1969 | Erdley et al. | 74/5.6 D X |
| 3,490,297 | 1/1970 | Brodersen | 74/5.6 D X |
| 3,522,737 | 8/1970 | Brenot | 74/5 R X |
| 3,722,295 | 3/1973 | Passarelli | 74/5 R |
| 4,061,043 | 12/1977 | Stiles | 74/5.6 D |
| 4,217,787 | 8/1980 | Liebing et al. | 74/5.6 D |

FOREIGN PATENT DOCUMENTS

| | | |
|---|---|---|
| 1328401 | 4/1963 | France . |
| 1532665 | 6/1968 | France . |
| 2354537 | 1/1978 | France . |
| 120909 | 9/1981 | Japan ................ 74/5.46 |

Primary Examiner—Rodney H. Bonck
Attorney, Agent, or Firm—Kenneth E. Leeds; Alan H. MacPherson; Steven F. Caserza

[57] ABSTRACT

A gyroscope constructed in accordance with the present invention includes a flywheel (220) which can oscillate with at least two degrees of freedom about a central position in which the flywheel axis is aligned with the axis of a drive shaft (200), the flywheel being held radially and rotated relative to the body (100) of the apparatus. The gyroscope also includes a set of electrodes (101 to 104) for electrostatically controlling the position or for detecting the position of the flywheel. The electrodes are fixed relative to the body and face corresponding conducting surfaces of the flywheel. In accordance with the invention, the gyroscope further includes a rigid spinning casing (250) which encloses the flywheel in such a manner as to interpose a dielectric surface between the corresponding conducting surfaces of the flywheel and each electrode, the casing being fixed to the flywheel drive shaft but not having any degrees of freedom in oscillation relative to the body other than being free to spin.

6 Claims, 2 Drawing Figures

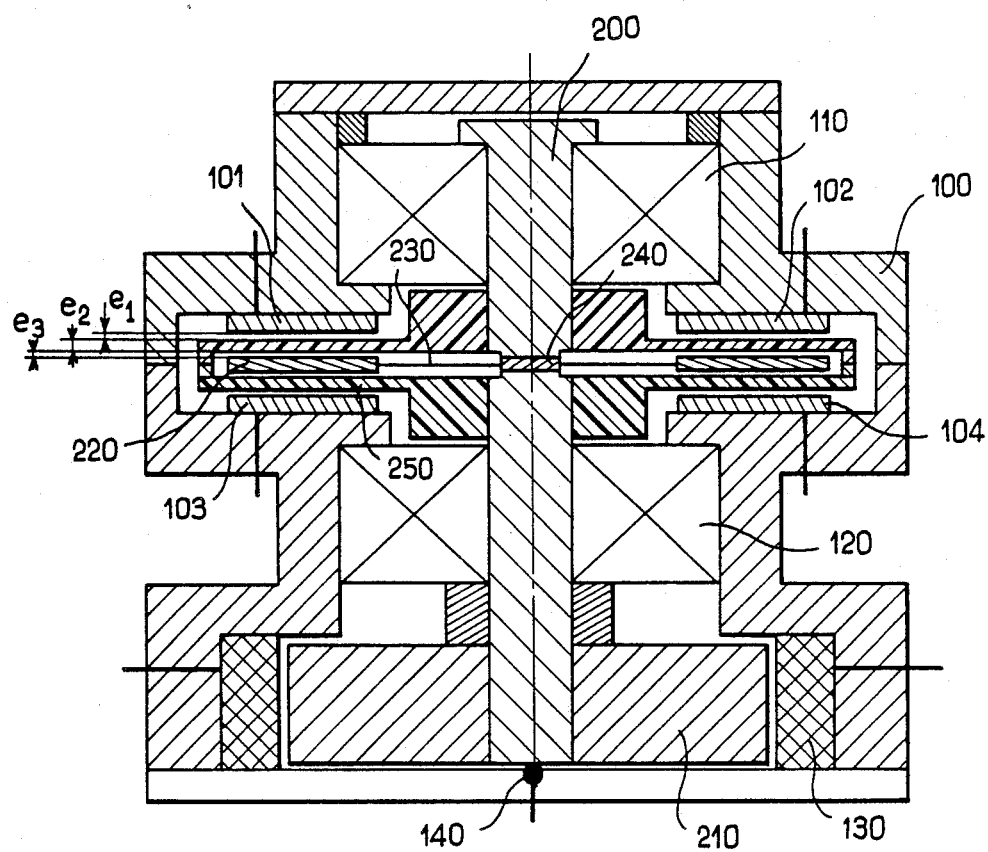
FIG_1
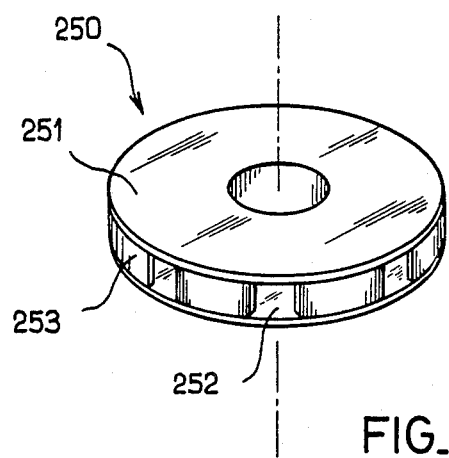
FIG_2

GYROSCOPE APPARATUS ROTATING CASING FOR A ROTOR

This application relates to my copending U.S. patent application, Ser. No. 06/593,765, filed Mar. 27, 1984.

The present invention relates to gyroscope apparatus.

In such apparatus, a flywheel is free to oscillate with at least two degrees of freedom about a central position in which the flywheel axis is aligned with a drive shaft axis and the flywheel is held radially and rotated relative to the body of the apparatus.

The invention is applicable to apparatuses of this type which include electrostatic means for controlling the position or for detecting the position of the flywheel, said means comprising electrodes which are fixed relative to the apparatus body, and each having a conducting surface facing a corresponding conducting surface on the flywheel.

In this specification, the term "electrostatic means for detecting the position" is used to designate means for making capacitance measurements between at least one electrode and the surface of the flywheel. Such measurements enable the angular orientation of the flywheel to be determined, or else its axial position, or both.

Similarly, the term "electrostatic means for controlling the position" is used to designate means for electrostatically charging the flywheel by means of electrodes in such a manner as to exert an axial supporting force thereon, or a precession torque thereon, or both. In particular, if a precession torque is applied to the flywheel in such a manner as to return it to its central position, the apparatus operates as a rate gyro.

The invention is applicable to apparatuses in which at least one of the position detecting and position controlling functions is provided by electrostatic means, ie. the invention covers the following possibilities:

(1) combined electrostatic detection and control;
(2) electrostatic detection without control (conventional gyroscope action);
(3) electrostatic detection with non-electrostatic control (eg. electromagnetic control); and
(4) electrostatic control together with non-electrostatic detection.

In apparatuses of this type, the high speed of the flywheel (generally about 400 revolutions per second) encourages disturbances due to the viscosity of the residual gas present in the apparatus housing in spite of its being sealed and pumped down to a fairly hard vacuum.

These disturbances are produced by friction between stationary gas molecules and the surface of the flywheel. This friction exerts unwanted or "fan" torque on the flywheel, which despite its small value can nonetheless lead to non-negligible measurement errors.

Further, because of the flywheel's degrees of freedom for oscillation, and possibly one degree of freedom in translation also, there is also a risk of the spinning flywheel making contact with the fixed electrodes during a large amplitude acceleration or during high speed rotation. Any such contact is likely to damage or destroy the flywheel (the speed of the flywheel periphery may reach several meters per second (m/s) or even several tens of m/s).

Preferred embodiments of the invention remedy these drawbacks.

SUMMARY OF THE INVENTION

To do this, the invention proposes fitting a rigid spinning casing to the flywheel drive shaft, said casing enclosing the flywheel in such a manner as to place a dielectric surface between the corresponding conducting surfaces of the flywheel and the stationary electrodes.

The casing does not prevent electrostatic induction, but it does provide two useful effects: firstly it acts as a mechanical stop for excessive flywheel movement (without any danger to the flywheel since the casing is spinning at the same speed as the flywheel); and secondly it provides dynamic drive to the residual gas inside the casing, thus eliminating the unwanted effects of the viscosity of the residual gas.

In a preferred embodiment, the casing has openings around its periphery. In this manner the residual gas present in the apparatus (which is sealed and which contains a fairly hard vacuum) is driven by rotation of the casing without there being any need to seal the casing.

However, in a variant, the casing may be sealed and a vacuum maintained therein.

Advantageously, the peripheral wall of the casing (i.e. the wall which is not situated between the electrodes and the conducting surfaces of the flywheel) has a metal surface to provide magnetic shielding in the radial direction.

Preferably the permittivity of the dielectric surfaces of the casing is equal to at least 10.

BRIEF DESCRIPTION OF THE DRAWING

An embodiment of the invention is described by way of example with reference to the accompanying drawing, in which:

FIG. 1 is a diagrammatic section through a gyroscope apparatus in accordance with the invention; and FIG. 2 is a perspective view of a casing as implemented by the present invention.

MORE DETAILED DESCRIPTION

In FIG. 1, the housing 100 of a gyroscope apparatus supports a rotary shaft 200 via a pair of bearings 110, 120. The shaft 200 is rotated by a synchronous motor having a stator 130 which is fixed to the housing 100, and a rotor 210 which rotates with shaft 200.

The shaft 200 drives rotary equipment comprising both an inertia flywheel 220 which is connected via a universal joint 230 to a drive hub 240 in the shaft, and a rotating casing 250 as implemented by the invention. The housing has a series of electrodes such as 101 to 104 which apply precession torques, and optionally an axial lift force, to the flywheel 220 by means of the electrostatic effect. Alternatively they serve to measure angular and axial displacements of the flywheel about a central position.

It will be observed that in order to make position detection possible by capacitive measurements, the inertia flywheel 220, the universal joint 230, the hub 240 and the shaft 200 must be electrically conductive and connected to one another as well as to a fixed terminal of the apparatus, e.g. via a spinning contact 140. Such an electrical connection is likewise desirable for applying precession torque or lift, since it serves to keep the flywheel at a constant potential, e.g. at ground potential.

The surfaces of the rotating casing 250 extend radially, and therefore serve both to provide a mechanical stop for the flywheel and to eliminate interfering torque due to driving the residual gas.

However, these surfaces are situated between the flywheel 220 and the electrodes 101 to 104. They thus tend to increase the gap between the flywheel and the electrodes which could be unfavorable from the point of view of apparatus sensitivity.

A material having a relative dielectric permittivity of at least 10 is therefore chosen as the material which is interposed between the corresponding conductive surfaces of the flywheel and the electrodes.

Thus if, by way of example, the gap between an electrode and the flywheel is made up as follows: a first thickness $e_1$ of 12 μm of vacuum, a second thickness $e_2$ of 120 μm of casing, and a third thickness $e_3$ of 12 μm of vacuum; then the equivalent gap of vacuum only would be 36 μm, which is perfectly acceptable electrically.

Further, since the electric field is divided by the relative permittivity, the risk of dielectric breakdown is greatly reduced.

FIG. 2 shows an example of a spinning casing made in this manner: it comprises two plane faces 251 and 252 made of dielectric material and separated by spacers 253.

Advantageously, the spacers 253 which constitute the peripheral wall of the casing, are made of metallic material to constitute magnetic shielding in the radial direction, thus protecting the metal flywheel against outside influences.

I claim:

1. A gyroscope apparatus comprising:

a housing;

a flywheel within said housing which is free to oscillate with at least two degrees of freedom about a central position in which the flywheel axis is aligned with the axis of a drive shaft, said flywheel being held radially and rotated relative to said housing by mechanical fitting of the flywheel to the drive shaft;

electrostatic means for controlling the position of the flywheel, said means including electrodes which are fixed relative to the housing and which face corresponding conducting surfaces of the flywheel; and a rigid spinning casing made substantially of dielectric material which encloses the flywheel in such a manner as to interpose a dielectric surface between the corresponding conducting surfaces of the flywheel and each electrode, said casing being fixed to the flywheel drive shaft, whereby the physical gap between the flywheel and the electrodes is increased without corresponding increase of the equivalent dielectric gap between the conducting surfaces of the flywheel and the electrodes.

2. A gyroscope apparatus comprising:

a housing;

a flywheel within said housing which is free to oscillate with at least two degrees of freedom about a central position in which the flywheel axis is aligned with the axis of a drive shaft, said flywheel being held radially and rotated relative to said housing by mechanical fitting of the flywheel to the drive shaft;

electrostatic means for detecting the position of the flywheel, said means including electrodes which are fixed relative to the housing and which face corresponding conducting surfaces of the flywheel; and a rigid spinning casing made essentially of dielectric material which encloses the flywheel in such a manner as to interpose a dielectric surface between the corresponding conducting surfaces of the flywheel and each electrode, said casing being fixed to the flywheel drive shaft, whereby the physical gap between the flywheel and the electrodes is increased without corresponding increase of the equivalent dielectric gap between the conducting surfaces of the flywheel and the electrodes.

3. Apparatus according to claim 1 or 2 wherein the casing has openings in its peripheral wall.

4. Apparatus according to claim 1 or 2 wherein the casing is sealed and a vacuum is maintained therein.

5. Apparatus according to claim 1 or 2 wherein the peripheral wall of the casing includes a metallic surface providing the flywheel with magnetic shielding in the radial direction.

6. Apparatus according to claim 1 or 2 wherein the relative permittivity of the dielectric surfaces of the casing is at least equal to 10.

* * * * *